United States Patent
Yang et al.

(10) Patent No.: US 12,512,894 B2
(45) Date of Patent: Dec. 30, 2025

(54) BEAM FAILURE HANDLING METHOD AND TERMINAL

(71) Applicant: VIVO MOBILE COMMUNICATION CO., LTD., Guangdong (CN)

(72) Inventors: Yu Yang, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 503 days.

(21) Appl. No.: 17/677,415

(22) Filed: Feb. 22, 2022

(65) Prior Publication Data
US 2022/0173789 A1  Jun. 2, 2022

Related U.S. Application Data

(63) Continuation of application No. PCT/CN2020/110571, filed on Aug. 21, 2020.

(30) Foreign Application Priority Data

Aug. 23, 2019  (CN) .......................... 201910786784.8

(51) Int. Cl.
  *H04W 72/23*  (2023.01)
  *H04B 7/06*  (2006.01)
  (Continued)

(52) U.S. Cl.
  CPC ...... *H04B 7/06964* (2023.05); *H04W 72/046* (2013.01); *H04W 72/1263* (2013.01);
  (Continued)

(58) Field of Classification Search
  CPC ........... H04W 72/046; H04W 72/1263; H04W 72/23; H04W 76/19; H04W 76/30;
  (Continued)

(56) References Cited

U.S. PATENT DOCUMENTS

| | | |
|---|---|---|
| 2018/0279284 A1 | 9/2018 | Wang et al. |
| 2019/0281480 A1 | 9/2019 | Wei et al. |

(Continued)

FOREIGN PATENT DOCUMENTS

| | | |
|---|---|---|
| CN | 107612602 A | 1/2018 |
| CN | 110139291 A | 8/2019 |

(Continued)

OTHER PUBLICATIONS

Huawei et al., "Beam Failure Recovery for SCell," 3GPP TSG RAN WG1 Meeting #96bis, Apr. 8-12, 2019, Agenda Item 7.2.8.6, R1-1903977, Xi'an, China, 7 Pages (Year: 2019).*

Intel Corporation, "On Beam Management Enhancement," 3GPP TSG RAN WG1 Meeting #97, May 13-17, 2019, Agenda Item 7.2.8.3, R1-1906816, Reno, NV, USA, 16 Pages (Year: 2019).*

(Continued)

*Primary Examiner* — Lan-Huong Truong
(74) *Attorney, Agent, or Firm* — BROOKS KUSHMAN P.C.

(57) ABSTRACT

Embodiments of this disclosure provide a beam failure handling method and a terminal. The method includes: triggering transmission of at least one of BFRQ information and a scheduling request SR for BFRQ if a beam failure occurs in an SCell, where the terminal has at least one of the following features related to the SCell: if a first condition is met, triggering transmission of at least one of subsequent BFRQ information and subsequent SRs for BFRQ is forbidden; triggering transmission of at least one SR for BFRQ is allowed; and triggering transmission of BFRQ information is restricted to one time; if a second condition is met, a BFI counter skips or stops counting; and if a third condition is met, a BFI counter is reset.

20 Claims, 2 Drawing Sheets

(51) Int. Cl.
    *H04W 72/044*     (2023.01)
    *H04W 72/1263*     (2023.01)
    *H04W 76/19*     (2018.01)
    *H04W 76/30*     (2018.01)
    *H04W 80/02*     (2009.01)

(52) U.S. Cl.
    CPC ........... *H04W 72/23* (2023.01); *H04W 76/19* (2018.02); *H04W 76/30* (2018.02); *H04W 80/02* (2013.01)

(58) Field of Classification Search
    CPC ..... H04W 80/02; H04W 76/15; H04W 76/34; H04W 24/02; H04W 24/10; H04W 72/21; H04B 7/0695
    See application file for complete search history.

(56) References Cited

U.S. PATENT DOCUMENTS

| | | | |
|---|---|---|---|
| 2020/0267048 A1* | 8/2020 | Yu ........................ | H04B 7/0695 |
| 2020/0267797 A1* | 8/2020 | Wei ........................ | H04W 72/21 |
| 2020/0350973 A1* | 11/2020 | Cirik ................. | H04W 72/1263 |
| 2020/0413395 A1 | 12/2020 | Chen et al. | |
| 2021/0378046 A1* | 12/2021 | Shimoda ................ | H04B 7/022 |
| 2022/0116094 A1* | 4/2022 | Wang ................... | H04B 7/0695 |
| 2022/0158714 A1* | 5/2022 | Matsumura ........... | H04W 76/19 |
| 2022/0201705 A1* | 6/2022 | Tsai .................. | H04W 28/0278 |

FOREIGN PATENT DOCUMENTS

| | | | | |
|---|---|---|---|---|
| CN | 110149179 A | 8/2019 | | |
| JP | 2021515477 A | 6/2016 | | |
| WO | 2019029667 A1 | 2/2019 | | |
| WO | 2019033072 A1 | 2/2019 | | |
| WO | WO-2019032882 A1 * | 2/2019 | ........... | H04B 7/0695 |
| WO | 2019141398 A1 | 7/2019 | | |
| WO | 2019170159 A1 | 9/2019 | | |

OTHER PUBLICATIONS

First Office Action for Singapore Application No. 11202201745R, dated Feb. 23, 2024, 11 Pages.
First Office Action for Japanese Application No. 2022-512426, dated Feb. 13, 2023, 4 Pages.
Ericsson, "BFR on SCell", 3GPP TSG-RAN WG2 #107, Prague, Czech Republic, Aug. 2019, R2-1910357, 7 Pages.
Partial Supplementary European Search Report for Application No. 20857273.5-1216, dated Sep. 1, 2022, 18 Pages.
Huawei et al., "Enhancements on Multi-Beam Operation," 3GPP TSG RAN WG1 #98, Agenda item 7.2.8.3, Aug. 26-30, 2019, R1-1908067, Prague, Czech Republic, 20 Pages.
Samsung, "RAN2 Aspects of SCell BFR," 3GPP TSG-RAN2 107, Agenda item 11.16, Aug. 26-30, 2019, R1-1908821, Prague, Czech Republic, 5 Pages.
Second Office Action for Chinese Application No. 201910786784.8, dated Mar. 10, 2022, 7 Pages.
First Office Action for Indian Application No. 202227014370, dated Aug. 3, 2022, 7 Pages (including English translation).
International Search Report and Written Opinion for Application No. PCT/CN2020/110571, dated Nov. 25, 2020, 6 Pages.
Huawei et al., "Beam Failure Recovery for SCell," 3GPP TSG RAN WG1 Meeting #96bis, Apr. 8-12, 2019, Agenda Item 7.2.8.6, R1-1903977, Xi'an, China, 7 Pages.
Fujitsu, "Enhancements on Multi-Beam Operation," 3GPP TSG RAN WG1 Meeting #97, May 13-17, 2019, Agenda Item 7.2.8.3, R1-1906446, Reno, NV, USA, 7 Pages.
Intel Corporation, "On Beam Management Enhancement," 3GPP TSG RAN WG1 Meeting #97, May 13-17, 2019, Agenda Item 7.2.8.3, R1-1906816, Reno, NV, USA, 16 Pages.
Intehuawei et al., "BFR with SCell Deactivation and MAC Reset," 3GPP TSG-RAN WG2 Meeting #101bis, Apr. 16-20, 2018, Agenda Item 10.3.1.4.2, R2-1805887, Sanya, China, 2 Pages.
Second Korean Office Action for Korean Patent Application No. 10-2022-7009474 mailed Oct. 23, 2025. 15 pages.
OPPO. Discussion on SCell BFR. 3GPP TSG-RAN WG2 Meeting #107. R2-1909673. Online. Aug. 2019. 3 pages.

* cited by examiner

BEAM FAILURE HANDLING METHOD AND TERMINAL

CROSS-REFERENCE TO RELATED APPLICATIONS

This application is a continuation application of International Application No. PCT/CN2020/110571 filed on Aug. 21, 2020, which claims priority to Chinese Patent Application No. 201910786784.8, filed on Aug. 23, 2019, which are incorporated herein by reference in their entireties.

TECHNICAL FIELD

This disclosure relates to the field of communications technologies, and in particular, to a beam failure handling method and a terminal.

BACKGROUND

In some high-band communications systems (for example, 5G communications systems), because a wavelength of a radio signal is short, signal propagation is likely to be blocked, resulting in interruption of signal propagation. Accordingly, some communications systems are provided with a beam failure recovery (BFR) mechanism. However, how to transmit a BFRQ message when a beam failure occurs in a secondary cell (SCell) has not been defined, and consequently, BFR is not supported in the SCell.

SUMMARY

According to a first aspect, an embodiment of this disclosure provides a beam failure handling method, applied to a terminal and including:
triggering transmission of at least one of BFRQ information and a scheduling request (SR) for BFRQ if a beam failure occurs in an SCell, wherein
the terminal has at least one of the following features related to the SCell:
if a first condition is met, triggering transmission of at least one of subsequent BFRQ information and subsequent SRs for BFRQ is forbidden;
triggering transmission of at least one SR for BFRQ is allowed; and
triggering transmission of BFRQ information is restricted to one time;
if a second condition is met, a beam failure instance (BFI) counter skips or stops counting; and
if a third condition is met, a BFI counter is reset, wherein the third condition includes at least one of the following:
beam failure recovery succeeds, triggering transmission of at least one of subsequent BFRQ information and subsequent SRs for BFRQ is forbidden, and the forbidding of the triggering transmission of at least one of subsequent BFRQ information and subsequent SRs for BFRQ is lifted.

According to a second aspect, an embodiment of this disclosure provides a terminal, including:
a triggering module, configured to trigger transmission of at least one of BFRQ information and a scheduling request SR for BFRQ if a beam failure occurs in an SCell, where
the terminal has at least one of the following features related to the SCell:
if a first condition is met, triggering transmission of at least one of subsequent BFRQ information and subsequent SRs for BFRQ is forbidden;
triggering transmission of at least one SR for BFRQ is allowed; and
triggering transmission of BFRQ information is restricted to one time;
if a second condition is met, a BFI counter skips or stops counting; and
if a third condition is met, a BFI counter is reset, wherein the third condition includes at least one of the following:
beam failure recovery succeeds, triggering transmission of at least one of subsequent BFRQ information and subsequent SRs for BFRQ is forbidden, and the forbidding of the triggering transmission of at least one of subsequent BFRQ information and subsequent SRs for BFRQ is lifted.

According to a third aspect, an embodiment of this disclosure provides a terminal, including a memory, a processor, and a program stored in the memory and capable of running on the processor, where when the program is executed by the processor, the steps of the beam failure handling method according to the embodiment of this disclosure are implemented.

According to a fourth aspect, an embodiment of this disclosure provides a computer-readable storage medium, where the computer-readable storage medium stores a computer program, and when the computer program is executed by a processor, the steps of the beam failure handling method according to the embodiment of this disclosure are implemented.

DETAILED DESCRIPTION

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure shall fall within the protection scope of this disclosure.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, an illustration, or a description. Any embodiment or design solution described as "an example" or "for example" in the embodiments of this disclosure shall not be interpreted to be more preferential or advantageous than other embodiments or design solutions. Specifically, the terms such as "an example" or "for example" are intended to present related concepts in a specific manner.

The following describes the embodiments of this disclosure with reference to the accompanying drawings. A beam failure handling method and a terminal that are provided in the embodiments of this disclosure may be applied to a wireless communications system. The wireless communications system may be a new radio (NR) system, an evolved long term evolution (eLTE) system, a long term evolution (LTE) system, a later evolved communications system, or the like.

Figure 1:
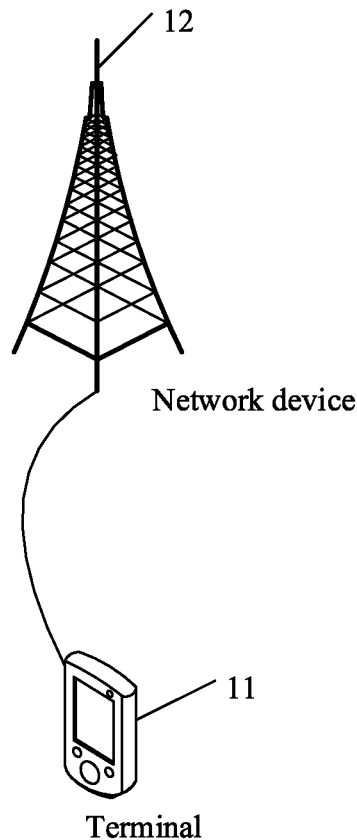
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a terminal 11 and a network device 12. The terminal 11 may be a user terminal (User Equipment, UE) or other terminal-side devices such as a mobile phone, a tablet personal computer, a laptop computer, a personal digital assistant (PDA), a mobile Internet device (MID), a wearable device, or a robot. It should be noted that the terminal 11 is not limited to any specific type in the embodiments of this disclosure. The foregoing network device 12 may be a 4G base station, or a 5G base station, or a base station of a later version, or a base station in other communications systems, or may be referred to as a NodeB, or an evolved NodeB, or a transmission reception point (TRP), or an access point (AP), or other terms in the field. Provided that a same technical effect is achieved, the network device is not limited to any specific technical term. In addition, the foregoing network device 12 may be a master node (MN) or a secondary node (SN). It should be noted that, in the embodiments of this disclosure, the 5G base station is used as only an example, but the network device is not limited to any specific type.

Figure 2:
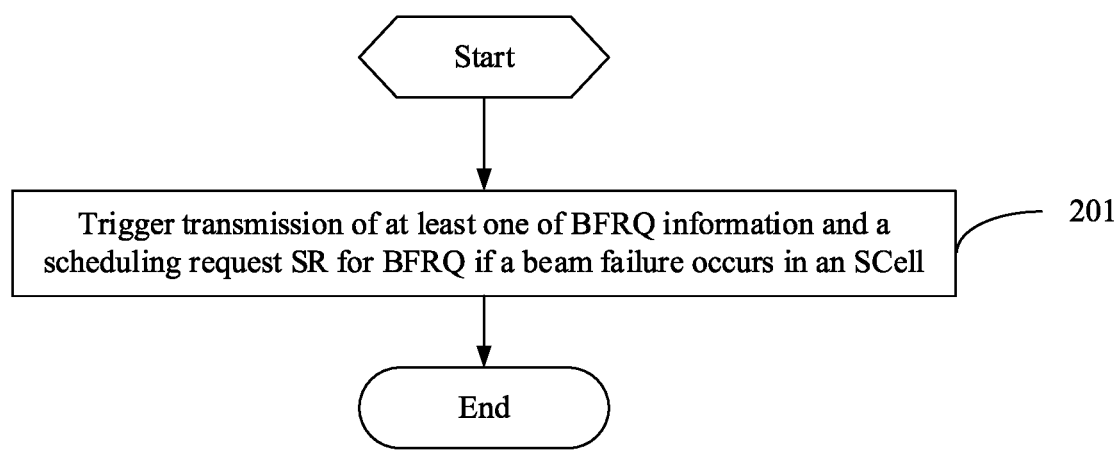
FIG. 2 is a flowchart of a beam failure handling method according to an embodiment of this disclosure.

FIG. 2 is a flowchart of a beam failure handling method according to an embodiment of this disclosure. The method is applied to a terminal. As shown in FIG. 2, the method includes the following step:

Step 201: Trigger transmission of at least one of BFRQ information and a scheduling request SR for BFRQ if a beam failure occurs in an SCell.

The terminal has at least one of the following features related to the SCell:

if a first condition is met, triggering transmission of at least one of subsequent BFRQ information and subsequent SRs for BFRQ is forbidden;
  triggering transmission of at least one SR for BFRQ is allowed; and
  triggering transmission of BFRQ information is restricted to one time;
if a second condition is met, a BFI counter (BFI_COUNTER) skips or stops counting; and
if a third condition is met, a BFI counter (BFI_COUNTER) is reset.

The third condition includes at least one of the following: beam failure recovery succeeds;
  triggering transmission of at least one of subsequent BFRQ information and subsequent SRs for BFRQ is forbidden; and
  the forbidding of the triggering transmission of at least one of subsequent BFRQ information and subsequent SRs for BFRQ is lifted.

The triggering transmission of at least one of BFRQ information and a SR for BFRQ if a beam failure occurs in an SCell may be: if a beam failure occurs in the SCell, triggering the BFRQ information and/or triggering the SR for BFRQ, and transmitting the BFRQ information and/or transmitting the SR for BFRQ. For example, when detecting that a beam failure occurs in an SCell, the terminal triggers BFRQ information and/or a SR for BFRQ and transmits the BFRQ information and/or the SR for BFRQ.

In addition, the detecting that a beam failure occurs in an SCell may be that a physical layer of the terminal measures a beam failure detection reference signal (BFD RS) of the SCell, and reports a BFI indication to a media access control (MAC) layer based on a measurement result, and the MAC layer starts or restarts a beam failure detection timer (beamFailureDetectionTimer) corresponding to the SCell and adds 1 to a BFI counter (BFI_COUNTER). When BFI_COUNTER is greater or equal to a maximum count value (BFI_COUNTER>=beamFailureInstanceMaxCount), it is determined that a beam failure event has occurred in the SCell.

It should be noted that in this embodiment of this disclosure, how a beam failure is detected (or determined) is not limited. For example, a method similar to that defined for a beam failure in a primary cell (PCell) in a protocol may be used, or a new method introduced in a subsequent protocol version may be used.

The foregoing SCell may be an SCell in a master cell group (MCG) or in a secondary cell group (SCG).

The foregoing BFRQ information may be related information for requesting beam failure recovery. For example, the BFRQ information may include at least one of the following:

index information and new beam information of the SCell in which the beam failure occurs.

The foregoing new beam information may be information about a new beam selected by the terminal. For example, the physical layer of the terminal may measure a candidate beam reference signal (candidate beam RS) of the SCell in which a beam failure occurs, and search for a new candidate beam with quality meeting a preset requirement, to obtain the new beam.

It should be noted that in the embodiments of this disclosure, a beam may also be referred to as a spatial filter, a spatial domain transmission filter, or the like. Beam information may also be expressed with other terms, such as transmission configuration indication state (TCI state) information, quasi-colocation (QCL) information, and spatial relation information.

In addition, the foregoing BFRQ information may be transmitted in a media access control control element (MAC CE). Certainly, this is not limited. In addition, the BFRQ information may also be referred to as a BFRQ or a BFRQ report.

The foregoing SR for BFRQ may be an SR for requesting a network side to schedule a resource. Further, the foregoing SR for BFRQ may be a protocol-defined SR for requesting the network side to schedule an uplink resource for data transmission, or a protocol-defined SR for BFRQ, for example, a SR for BFRQ for PCell. Alternatively, the foregoing SR may be a dedicated SR, and the SR is transmitted on a network-configured dedicated physical uplink control channel (PUCCH) resource for BFR (dedicated SR-like PUCCH resource). The foregoing SR for BFRQ may be transmitted in a PCell, a primary secondary cell (PSCell), or an SCell.

It should be noted that the foregoing BFRQ information and SR for BFRQ may be transmitted in different cells or a same cell, on different resources or a same resource, or at different occasions or a same occasion.

It should be noted that in this embodiment of this disclosure, after a beam failure occurs in the SCell, transmission of at least one of BFRQ information and a SR for BFRQ is triggered, and then BFR can be supported in the SCell. This is because the terminal can complete a BFR procedure on the basis of the at least one of BFRQ information and a SR for BFRQ after the at least one of BFRQ information and a SR for BFRQ has been transmitted. It should be noted that in this embodiment of this disclosure, the BFR procedure is not limited. The procedure may be defined in a protocol, for example, a BFR procedure for PCell, or a new BFR procedure for SCell defined in a subsequent protocol.

In this embodiment of this disclosure, that if a first condition is met, triggering transmission of at least one of subsequent BFRQ information and subsequent SRs for BFRQ is forbidden may be: in a case that the foregoing first condition is met, triggering at least one of subsequent BFRQ information and subsequent SRs for BFRQ is forbidden, and transmitting at least one of subsequent BFRQ information and subsequent SRs for BFRQ is forbidden. In addition, the subsequent BFRQ information and subsequent SRs for BFRQ may be BFRQ information and SRs for BFRQ following the BFRQ information and SR for BFRQ that are triggered in step 201.

Optionally, the first condition includes at least one of the following:
the BFRQ information is triggered, the BFRQ information is being transmitted, transmitting the BFRQ information succeeds, and a first timer is running.

It should be noted that, that the BFRQ information is triggered may be: triggering transmission of at least one of subsequent BFRQ information and subsequent SRs for BFRQ is forbidden after the BFRQ information is triggered in step 201. In other words, in this case, it is unnecessary to determine whether the first condition is met or not, and the first condition is met once the BFRQ information is triggered. Therefore, that if a first condition is met, triggering transmission of at least one of subsequent BFRQ information and subsequent SRs for BFRQ is forbidden may be: if the BFRQ information is triggered, triggering transmission of at least one of subsequent BFRQ information and subsequent SRs for BFRQ is forbidden; and if a MAC CE for transmitting the BFRQ is triggered, triggering transmission of at least one of subsequent BFRQ information and subsequent SRs for BFRQ is forbidden.

Similarly, that the BFRQ information is being transmitted may be: triggering transmission of at least one of subsequent BFRQ information and subsequent SRs for BFRQ is forbidden after the BFRQ information is transmitted in step 201. In other words, in this case, it is unnecessary to determine whether the first condition is met or not, and the first condition is met once the BFRQ information has been transmitted. Therefore, that if a first condition is met, triggering transmission of at least one of subsequent BFRQ information and subsequent SRs for BFRQ is forbidden may be: if the BFRQ information is transmitted, triggering transmission of at least one of subsequent BFRQ information and subsequent SRs for BFRQ is forbidden; and if a MAC CE for transmitting the BFRQ is transmitted, triggering transmission of at least one of subsequent BFRQ information and subsequent SRs for BFRQ is forbidden.

A starting condition of the first timer may be at least one of the following: the BFRQ information is triggered, the BFRQ information is being transmitted, and transmitting the BFRQ information succeeds. Duration of the first timer may be configured by the network, prescribed in a protocol, pre-configured by the terminal, or the like. The timer may be construed as a timer for the foregoing forbidding purposes.

That the transmitting the BFRQ information succeeds may be: hybrid automatic repeat request acknowledgment (HARQ-ACK) information for a MAC CE for BFRQ is received from the network.

If the first condition is met, triggering transmission of at least one of subsequent BFRQ information and subsequent SRs for BFRQ is forbidden. In this way, during the SCell BFR procedure, when a beam failure occurs in an SCell, the MAC layer of the terminal is forbidden from triggering transmission of an SR and/or BFRQ information of the SCell in which the beam failure occurs, thereby avoiding triggering the SR and/or BFRQ information of the SCell for a plurality of times because BFI_COUNTER keeps counting, and preventing affecting the ongoing SCell BFR procedure.

In addition, a stopping condition of the first timer is at least one of the following: the SCell is released, the SCell is deactivated, a bandwidth part (BWP) is switched, and beam failure recovery succeeds.

That the SCell is released may be that a resource in the SCell is released, that the SCell is deactivated may be that a deactivation operation is performed on the SCell, and a BWP is switched may be that a BWP is switched in the SCell.

After the first timer stops, the forbidding of the triggering transmission of at least one of subsequent BFRQ information and subsequent SRs for BFRQ may be lifted. Timely lifting of the forbidding of the triggering transmission of at least one of subsequent BFRQ information and subsequent SRs for BFRQ allows the terminal to implement beam failure detection for the SCell again, so that when a beam failure occurs again, at least one of BFRQ information and a SR for BFRQ is transmitted in a timely manner for timely and quick beam failure recovery.

It should be noted that in this embodiment of this disclosure, that beam failure recovery succeeds may include at least one of the following:
a PDCCH beam is switched;
a BFD RS beam is switched;
a physical downlink shared channel (PDSCH) beam is switched;
first downlink control information (DCI) is received from a network side;
first radio resource control (RRC) signaling is received from a network side; and
a first MAC CE command is received from a network side.

Beam switching may be construed as switching to a new beam for channel transmission, that is, TCI state or QCL information of a channel is updated.

That a PDCCH beam is switched may be: the terminal receives a MAC CE activation command for a PDCCH TCI state or a higher layer parameter in RRC signaling for configuring a PDCCH TCI state (TCI-StatesPDCCH-ToAddlist and/or TCI-StatesPDCCH-ToReleaseList).

That a PDSCH beam is switched may be: the terminal receives RRC configuration signaling for a PDSCH TCI state, or a MAC CE activation command for a PDSCH TCI state, or DCI indication signaling for a PDSCH TCI state.

That a BFD RS beam is switched may include at least one of a BFD RS beam for detecting PDCCH beam quality having been switched and a BFD RS beam for detecting PDSCH beam quality having been switched. That a BFD RS beam is switched may be: the terminal receives RRC configuration signaling for a BFD RS TCI state or QCL information, or a MAC CE activation command for a BFD RS TCI state or QCL information, or DCI indication signaling for a BFD RS TCI state or QCL information.

In addition, the foregoing first DCI may have at least one of the following features:
the first DCI is transmitted on a dedicated control resource for beam failure recovery;
a format of the first DCI is a DCI format with cyclic redundancy check CRC scrambled by a radio network temporary identifier RNTI for BFR;
the first DCI is used for indicating beam information of a downlink channel or reference signal of the SCell in which the beam failure occurs;
the first DCI is used for indicating performing beam measurement in the SCell in which the beam failure occurs; and
the first DCI is used for transmitting acknowledgment information for the BFRQ information.

The foregoing first RRC signaling has at least one of the following features:
the first RRC signaling includes release signaling for the SCell in which the beam failure occurs; and
the first RRC signaling is used for configuring beam information of a downlink channel or reference signal of the SCell in which the beam failure occurs.

The foregoing first MAC CE command may have at least one of the following features:
the first MAC CE command is used for activating beam information of a downlink channel or reference signal of the SCell in which the beam failure occurs;
the first MAC CE command includes deactivation signaling for the SCell in which the beam failure occurs; and
the first MAC CE command is used for transmitting acknowledgment information for the BFRQ information.

It should be noted that in this embodiment of this disclosure, beam failure recovery may be determined to be successful when the foregoing beam switching (at least one of PDCCH beam switching, BFD RS beam switching, and PDSCH beam switching) is implemented, and beam failure recovery may be determined to be successful when at least one of the foregoing first DCI, first RRC signaling, and first MAC CE command is received.

Optionally, in a case that the first condition is met and triggering transmission of at least one of subsequent BFRQ information and subsequent SRs for BFRQ is forbidden:
if a fourth condition is met, the forbidding of the triggering transmission of at least one of subsequent BFRQ information and subsequent SRs for BFRQ is lifted.

The fourth condition may include at least one of the following:
the SCell is released, the SCell is deactivated, a BWP is switched, and beam failure recovery succeeds.

In this embodiment, the forbidding of the triggering transmission of at least one of subsequent BFRQ information and subsequent SRs for BFRQ may be lifted in a timely manner, allowing the terminal to perform a beam failure recovery procedure for the SCell again, that is, when a beam failure occurs in the SCell again, transmitting at least one of BFRQ information and a SR for BFRQ in a timely manner for timely recovery.

In the embodiments of this disclosure, that triggering transmission of at least one SR for BFRQ is allowed may be: limiting the number of SRs triggered and transmitted by a terminal, to prevent the terminal from transmitting excessive SRs for BFRQ.

Optionally, that the triggering transmission of at least one SR for BFRQ is allowed means: before BFR is completed, the MAC layer is allowed to trigger transmission of at least one pending SR, and if the BFR is completed, the pending SR is canceled.

The allowing triggering transmission of at least one pending SR may be: allowing the MAC layer to transmit all or part of pending SRs.

In this embodiment, the MAC layer of the terminal may be allowed to trigger transmission of at least one SR for BFRQ on the basis that BFI_COUNTER is greater than or equal to a maximum count value. The "at least one" herein may be configured by the network, prescribed in a protocol, or pre-configured by the terminal. Triggering transmission of at least one pending SR is allowed, and if the BFR is completed, the pending SR is canceled. This can prevent the terminal from transmitting excessive pending SRs and causing waste of resources.

In the embodiments of this disclosure, that triggering transmission of BFRQ information is restricted to one time may be: for an SCell in which a beam failure occurs, the terminal is only allowed to trigger transmission of BFRQ information for one time, or may be: in a BFR procedure for the SCell, transmission of BFRQ information is triggered for one time only, thereby avoiding triggering BFRQ information for a plurality of times because BFI_COUNTER keeps counting, and preventing affecting the ongoing SCell BFR procedure.

Optionally, that triggering transmission of BFRQ information is restricted to one time means: before BFR is completed, triggering transmission of BFRQ information is restricted to one time.

For example, for a pending MAC CE for transmitting BFRQ (pending MAC CE for BFRQ), before SCell BFR is completed and after a MAC CE for BFRQ is triggered, the MAC layer of the terminal is only allowed to transmit only one MAC CE for BFRQ to the SCell in which a beam failure occurs.

In this embodiment, triggering transmission of BFRQ information is restricted to one time, thereby avoiding triggering BFRQ information for a plurality of times because BFI_COUNTER keeps counting, and preventing affecting the ongoing SCell BFR procedure.

In the embodiments of this disclosure, that if a second condition is met, a BFI counter skips or stops counting may be: in a case that the second condition is met, the BFI counter skips counting or counting of a BFI counter is forbidden, thereby avoiding triggering BFRQ information for a plurality of times because BFI_COUNTER keeps counting, and preventing affecting the ongoing SCell BFR procedure.

Optionally, the second condition includes at least one of the following:
the SCell is released, the SCell is deactivated, a BWP is switched, and a beam failure occurs in the SCell.

For that the SCell is released, that the SCell is deactivated, that a BWP is switched, and that a beam failure occurs in the SCell, reference may be made to the description in the above embodiments, and details are not repeated herein.

In the embodiments of this disclosure, that if a third condition is met, a BFI counter is reset may be: if a particular condition is met, the BFI counter is reset, thereby reducing triggers of a resource in which a beam failure occurs by BFI_COUNTER, to avoid transmitting excessive BFRQ information and SRs for BFRQ and prevent affecting the ongoing SCell BFR procedure. Also, resetting the BFI counter allows beam failure detection and beam failure recovery to be implemented again for the SCell.

Optionally, that if a third condition is met, a BFI counter is reset means: in a case that the second condition is not met, if the third condition is met, the BFI counter is reset; and/or in a case that the second condition is met and the BFI counter skips or stops counting, if the third condition is met, that the BFI counter skips or stops counting is lifted.

That the BFI counter skips or stops counting is lifted may be: the forbidding of counting of the counter is lifted, or counting of the BFI counter is not forbidden, so that the counter counts when the counter subsequently meets a counting condition.

If the third condition is met, that the BFI counter skips or stops counting is lifted. In this way, a beam failure that occurs again can be detected in a timely manner, and BFRQ information can be transmitted in a timely manner for BFR.

In the embodiments of this disclosure, if a beam failure occurs in an SCell, transmission of at least one of BFRQ information and a scheduling request SR for BFRQ is triggered, where the terminal has at least one of the following features related to the SCell: if a first condition is met, triggering transmission of at least one of subsequent BFRQ information and subsequent SRs for BFRQ is forbidden; triggering transmission of at least one SR for BFRQ is allowed; and triggering transmission of BFRQ information is restricted to one time; if a second condition is met, a BFI counter skips or stops counting; and if a third condition is met, a BFI counter is reset, where the third condition includes at least one of the following: beam failure recovery succeeds, triggering transmission of at least one of subsequent BFRQ information and subsequent SRs for BFRQ is forbidden, and the forbidding of the triggering transmission of at least one of subsequent BFRQ information and subsequent SRs for BFRQ is lifted.

In this way, BFR can be supported in the SCell.

Figure 3:
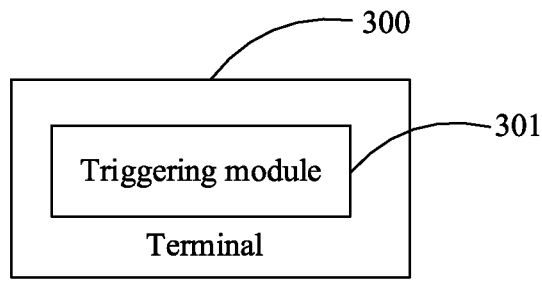
FIG. 3 is a structural diagram of a terminal according to an embodiment of this disclosure.

FIG. 3 is a structural diagram of a terminal according to an embodiment of this disclosure. As shown in FIG. 3, the terminal 300 includes:

a triggering module 301, configured to trigger transmission of at least one of BFRQ information and a scheduling request SR for BFRQ if a beam failure occurs in an SCell.

The terminal has at least one of the following features related to the SCell:

if a first condition is met, triggering transmission of at least one of subsequent BFRQ information and subsequent SRs for BFRQ is forbidden;
triggering transmission of at least one SR for BFRQ is allowed; and
triggering transmission of BFRQ information is restricted to one time;
if a second condition is met, a BFI counter skips or stops counting; and
if a third condition is met, a BFI counter is reset.

The third condition includes at least one of the following:
beam failure recovery succeeds, triggering transmission of at least one of subsequent BFRQ information and subsequent SRs for BFRQ is forbidden, and the forbidding of the triggering transmission of at least one of subsequent BFRQ information and subsequent SRs for BFRQ is lifted.

Optionally, the first condition includes at least one of the following:
the BFRQ information is triggered, the BFRQ information is being transmitted, transmitting the BFRQ information succeeds, and a first timer is running.

Optionally, a starting condition of the first timer is at least one of the following: the BFRQ information is triggered, the BFRQ information is being transmitted, and transmitting the BFRQ information succeeds.

Optionally, a stopping condition of the first timer is at least one of the following: the SCell is released, the SCell is deactivated, a bandwidth part BWP is switched, and beam failure recovery succeeds.

Optionally, in a case that the first condition is met and triggering transmission of at least one of subsequent BFRQ information and subsequent SRs for BFRQ is forbidden:
if a fourth condition is met, the forbidding of the triggering transmission of at least one of subsequent BFRQ information and subsequent SRs for BFRQ is lifted.

Optionally, the fourth condition includes at least one of the following:
the SCell is released, the SCell is deactivated, a BWP is switched, and beam failure recovery succeeds.

Optionally, the second condition includes at least one of the following:
the SCell is released, the SCell is deactivated, a bandwidth part BWP is switched, and a beam failure occurs in the SCell.

Optionally, that a BFI counter is reset means: in a case that the second condition is not met, if the third condition is met, the BFI counter is reset; and/or
in a case that the second condition is met and the BFI counter skips or stops counting, if the third condition is met, that the BFI counter skips or stops counting is lifted.

Optionally, that beam failure recovery succeeds includes at least one of the following:
a physical downlink control channel PDCCH beam is switched;
a beam failure detection reference signal BFD RS beam is switched;
a physical downlink shared channel PDSCH beam is switched;
first downlink control information DCI is received from a network side;
first radio resource control RRC signaling is received from a network side; and
a first media access control control element MAC CE command is received from a network side.

Optionally, the first DCI has at least one of the following features:
the first DCI is transmitted on a dedicated control resource for beam failure recovery;
a format of the first DCI is a DCI format with cyclic redundancy check CRC scrambled by a radio network temporary identifier RNTI for BFR;
the first DCI is used for indicating beam information of a downlink channel or reference signal of the SCell in which the beam failure occurs;
the first DCI is used for indicating performing beam measurement in the SCell in which the beam failure occurs; and
the first DCI is used for transmitting acknowledgment information for the BFRQ information;
and/or
the first RRC signaling has at least one of the following features:
the first RRC signaling includes release signaling for the SCell in which the beam failure occurs; and
the first RRC signaling is used for configuring beam information of a downlink channel or reference signal of the SCell in which the beam failure occurs;

and/or
the first MAC CE command has at least one of the following features:
the first MAC CE command is used for activating beam information of a downlink channel or reference signal of the SCell in which the beam failure occurs;
the first MAC CE command includes deactivation signaling for the SCell in which the beam failure occurs; and
the first MAC CE command is used for transmitting acknowledgment information for the BFRQ information.

Optionally, the SR is a dedicated SR, and the SR is transmitted on a network-configured dedicated physical uplink control channel PUCCH resource for BFR.

Optionally, the BFRQ information includes at least one of the following:
index information and new beam information of the SCell in which the beam failure occurs.

Optionally, that triggering transmission of at least one SR for BFRQ is allowed means: before beam failure recovery BFR is completed, a media access control MAC layer is allowed to trigger transmission of at least one pending SR, and if the BFR is completed, the pending SR is canceled.

Optionally, that triggering transmission of BFRQ information is restricted to one time means: before BFR is completed, triggering transmission of BFRQ information is restricted to one time.

The terminal provided in this embodiment of this disclosure can implement the processes implemented by the terminal in the method embodiment in FIG. 2, and support BFR in an SCell. To avoid repetition, details are not described herein again.

Figure 4:
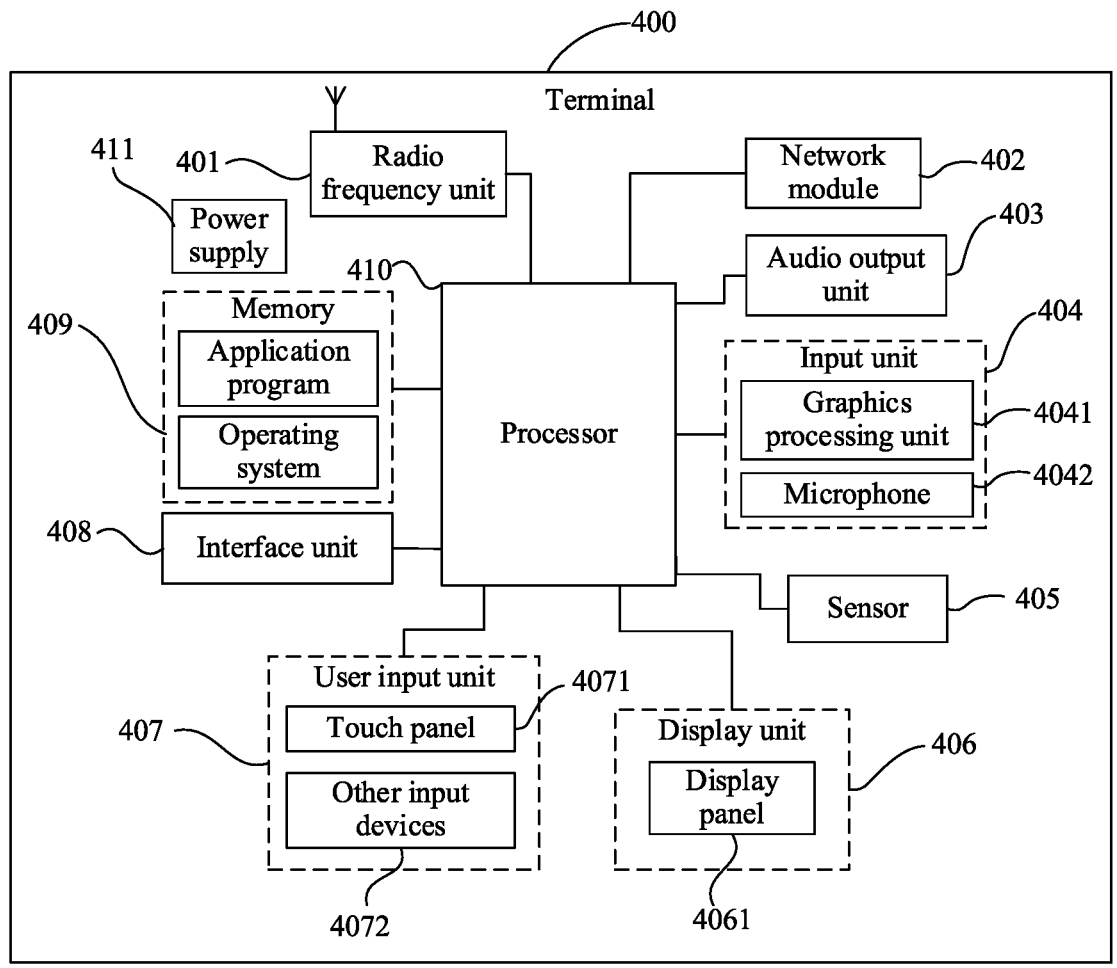
FIG. 4 is a structural diagram of another terminal according to an embodiment of this disclosure.

FIG. 4 is a schematic structural diagram of hardware of a terminal for implementing the embodiments of this disclosure.

The terminal 400 includes but is not limited to components such as a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art can understand that the terminal structure shown in FIG. 4 does not constitute a limitation on the terminal. The terminal may include more or fewer components than those shown in the figure, or some components may be combined, or there may be a different component layout. In this embodiment of this disclosure, the terminal includes, but is not limited to, a mobile phone, a tablet computer, a notebook computer, a palmtop computer, an in-vehicle terminal, a robot, a wearable device, and a pedometer.

A radio frequency unit 401 is configured to trigger transmission of at least one of BFRQ information and a scheduling request SR for BFRQ if a beam failure occurs in an SCell.

The terminal has at least one of the following features related to the SCell:
if a first condition is met, triggering transmission of at least one of subsequent BFRQ information and subsequent SRs for BFRQ is forbidden;
triggering transmission of at least one SR for BFRQ is allowed; and
triggering transmission of BFRQ information is restricted to one time;
if a second condition is met, a BFI counter skips or stops counting; and
if a third condition is met, a BFI counter is reset.

The third condition includes at least one of the following:
beam failure recovery succeeds, triggering transmission of at least one of subsequent BFRQ information and subsequent SRs for BFRQ is forbidden, and the forbidding of the triggering transmission of at least one of subsequent BFRQ information and subsequent SRs for BFRQ is lifted.

Optionally, the first condition includes at least one of the following:
the BFRQ information is triggered, the BFRQ information is being transmitted, transmitting the BFRQ information succeeds, and a first timer is running.

Optionally, a starting condition of the first timer is at least one of the following: the BFRQ information is triggered, the BFRQ information is being transmitted, and transmitting the BFRQ information succeeds.

Optionally, a stopping condition of the first timer is at least one of the following: the SCell is released, the SCell is deactivated, a bandwidth part BWP is switched, and beam failure recovery succeeds.

Optionally, in a case that the first condition is met and triggering transmission of at least one of subsequent BFRQ information and subsequent SRs for BFRQ is forbidden:
if a fourth condition is met, the forbidding of the triggering transmission of at least one of subsequent BFRQ information and subsequent SRs for BFRQ is lifted.

Optionally, the fourth condition includes at least one of the following:
the SCell is released, the SCell is deactivated, a BWP is switched, and beam failure recovery succeeds.

Optionally, the second condition includes at least one of the following:
the SCell is released, the SCell is deactivated, a bandwidth part BWP is switched, and a beam failure occurs in the SCell.

Optionally, that a BFI counter is reset means: in a case that the second condition is not met, if the third condition is met, the BFI counter is reset; and/or
in a case that the second condition is met and the BFI counter skips or stops counting, if the third condition is met, that the BFI counter skips or stops counting is lifted.

Optionally, that beam failure recovery succeeds includes at least one of the following:
a physical downlink control channel PDCCH beam is switched;
a beam failure detection reference signal BFD RS beam is switched;
a physical downlink shared channel PDSCH beam is switched;
first downlink control information DCI is received from a network side;
first radio resource control RRC signaling is received from a network side; and
a first media access control control element MAC CE command is received from a network side.

Optionally, the first DCI has at least one of the following features:
the first DCI is transmitted on a dedicated control resource for beam failure recovery;
a format of the first DCI is a DCI format with cyclic redundancy check CRC scrambled by a radio network temporary identifier RNTI for BFR;
the first DCI is used for indicating beam information of a downlink channel or reference signal of the SCell in which the beam failure occurs;

the first DCI is used for indicating performing beam measurement in the SCell in which the beam failure occurs; and the first DCI is used for transmitting acknowledgment information for the BFRQ information;

and/or the first RRC signaling has at least one of the following features:

the first RRC signaling includes release signaling for the SCell in which the beam failure occurs; and the first RRC signaling is used for configuring beam information of a downlink channel or reference signal of the SCell in which the beam failure occurs;

and/or the first MAC CE command has at least one of the following features:

the first MAC CE command is used for activating beam information of a downlink channel or reference signal of the SCell in which the beam failure occurs;

the first MAC CE command includes deactivation signaling for the SCell in which the beam failure occurs; and the first MAC CE command is used for transmitting acknowledgment information for the BFRQ information.

Optionally, the SR is a dedicated SR, and the SR is transmitted on a network-configured dedicated physical uplink control channel PUCCH resource for BFR.

Optionally, the BFRQ information includes at least one of the following:

index information and new beam information of the SCell in which the beam failure occurs.

Optionally, that triggering transmission of at least one SR for BFRQ is allowed means: before beam failure recovery BFR is completed, a media access control MAC layer is allowed to trigger transmission of at least one pending SR, and if the BFR is completed, the pending SR is canceled.

Optionally, that triggering transmission of BFRQ information is restricted to one time means: before BFR is completed, triggering transmission of BFRQ information is restricted to one time.

The foregoing terminal can support BFR in the SCell.

It should be understood that in this embodiment of this disclosure, the radio frequency unit 401 may be configured to: receive and send information, or receive and send a signal in a call process, and specifically, after receiving downlink data from a base station, send the downlink data to the processor 410 for processing; and also send uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may also communicate with a network and other devices by using a wireless communications system.

The terminal provides the user with wireless broadband Internet access by using the network module 402, for example, helping the user send or receive an email, browse a web page, access streaming media, and the like.

The audio output unit 403 may convert audio data received by the radio frequency unit 401 or the network module 402 or stored in the memory 409 into an audio signal and output the audio signal as a sound. In addition, the audio output unit 403 may further provide audio output (for example, a call signal received tone or a message received tone) that is related to a specific function performed by the terminal 400. The audio output unit 403 includes a speaker, a buzzer, a receiver, and the like.

The input unit 404 is configured to receive an audio or video signal. The input unit 404 may include a graphics processing unit (GPU) 4041 and a microphone 4042, and the graphics processing unit 4041 processes image data of a still picture or a video obtained by an image capture apparatus (for example, a camera) in a video capture mode or an image capture mode. A processed image frame may be displayed on the display unit 406. The image frame processed by the graphics processing unit 4041 may be stored in the memory 409 (or another storage medium) or transmitted by using the radio frequency unit 401 or the network module 402. The microphone 4042 is capable of receiving sounds and processing such sounds into audio data. The processed audio data can be converted in a telephone call mode into a format that can be sent to a mobile communication base station through the radio frequency unit 401, for outputting.

The terminal 400 may further include at least one sensor 405, for example, an optical sensor, a motion sensor, and other sensors. Specifically, the optical sensor may include an ambient light sensor and a proximity sensor. The ambient light sensor may adjust luminance of the display panel 4061 based on brightness of ambient light, and the proximity sensor may turn off the display panel 4061 and/or backlight when the terminal 400 moves close to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 405 may further include a fingerprint sensor, a pressure sensor, an iris sensor, a molecular sensor, a gyroscope, a barometer, a hygrometer, a thermometer, an infrared sensor, and the like. Details are not further described herein.

The display unit 406 is configured to display information input by the user or information provided to the user. The display unit 406 may include the display panel 4061. The display panel 4061 may be configured in a form of a liquid crystal display (LCD), an organic light-emitting diode (OLED), or the like.

The user input unit 407 may be configured to receive input digit or character information, and generate key signal input associated with user settings and function control of the terminal. Specifically, the user input unit 407 includes a touch panel 4071 and other input devices 4072. The touch panel 4071 is also referred to as a touchscreen, and may collect a touch operation of the user on or near the touch panel (for example, an operation performed on or near the touch panel 4071 by the user by using any appropriate object or accessory such as a finger or a stylus). The touch panel 4071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 410, and receives and executes a command transmitted by the processor 410. In addition, the touch panel 4071 may be implemented in a plurality of forms, for example, as a resistive, capacitive, infrared, or surface acoustic wave touch panel. In addition to the touch panel 4071, the user input unit 407 may further include other input devices 4072. Specifically, the other input devices 4072 may include but are not limited to a physical keyboard, a function key (for example, a volume control key or a switch key), a trackball, a mouse, and a joystick. Details are not described herein.

Further, the touch panel 4071 may cover the display panel 4061. When detecting a touch operation on or near the touch panel 4071, the touch panel 4071 transmits the touch operation to the processor 410 to determine a type of a touch event. Then, the processor 410 provides a corresponding visual output on the display panel 4061 based on the type of the touch event. In FIG. 4, the touch panel 4071 and the display panel 4061 serve as two separate components to implement input and output functions of the terminal. However, in some embodiments, the touch panel 4071 and the display panel 4061 may be integrated to implement the input and output functions of the terminal. This is not specifically limited herein.

The interface unit 408 is an interface between an external apparatus and the terminal 400. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 408 may be configured to receive an input (for example, data information or power) from the external apparatus and transmit the received input to one or more elements within the terminal 400, or may be configured to transmit data between the terminal 400 and the external apparatus.

The memory 409 may be configured to store software programs and various data. The memory 409 may primarily include a program storage area and a data storage area. The program storage area may store an operating system, an application program (such as an audio play function and an image play function) required by at least one function, and the like. The data storage area may store data (such as audio data and a phone book) created based on use of the mobile phone. In addition, the memory 409 may include a high-speed random access memory, and may further include a non-volatile memory such as a disk storage device, a flash memory device, or another volatile solid-state storage device.

The processor 410 is a control center of the terminal, and is connected to all components of the terminal by using various interfaces and lines. By running or executing software programs and/or modules that are stored in the memory 409 and calling data stored in the memory 409, the processor 410 executes various functions of the terminal and processes data, so as to perform overall monitoring on the terminal. The processor 410 may include one or more processing units. Optionally, the processor 410 may integrate an application processor and a modem processor. The application processor mainly processes an operating system, a user interface, an application program, and the like. The modem processor mainly processes wireless communication. It can be understood that the modem processor may alternatively be not integrated in the processor 410.

The terminal 400 may further include the power supply 411 (for example, a battery) that supplies power to each component. Optionally, the power supply 411 may be logically connected to the processor 410 by using a power management system, so as to implement functions such as charging management, discharging management, and power consumption management by using the power management system.

In addition, the terminal 400 includes some functional modules that are not shown. Details are not described herein.

Optionally, an embodiment of this disclosure further provides a terminal, including a processor 410, a memory 409, and a computer program stored in the memory 409 and capable of running on the processor 410. When the computer program is executed by the processor 410, the processes in the foregoing embodiments of the beam failure handling method are implemented, and a same technical effect can be achieved. To avoid repetition, details are not described herein again.

An embodiment of this disclosure further provides a computer-readable storage medium, where a computer program is stored in the computer readable storage medium. When the computer program is executed by a processor, the beam failure handling method provided in the embodiments of this disclosure is implemented, with the same technical effects achieved. To avoid repetition, details are not described herein again. For example, the computer-readable storage medium is a read-only memory (ROM), a random access memory (RAM), a magnetic disk, or an optical disk.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A beam failure handling method, comprising:
triggering, by a terminal, transmission of at least one of beam failure recovery request (BFRQ) information and a scheduling request (SR) for BFRQ when a beam failure occurs in a secondary cell (SCell), wherein the terminal has the following feature related to the SCell:
after the BFRQ information is transmitted, triggering transmission of subsequent BFRQ information is forbidden unconditionally or triggering transmission of an SR for BFRQ is forbidden unconditionally.

2. The method according to claim 1, wherein the terminal further has the following feature related to the SCell:

when a second condition is met, a beam failure instance (BFI) counter skips or stops counting.

3. The method according to claim 2, wherein the second condition comprises at least one of the following:

the SCell is released, the SCell is deactivated, a bandwidth part BWP is switched, and a beam failure occurs in the SCell.

4. The method according to claim 3, that when a third condition is met, a BFI counter is reset means: in a case that the second condition is not met, when the third condition is met, the BFI counter is reset.

5. The method according to claim 1, wherein the terminal further has the following feature related to the SCell:

when a third condition is met, a BFI counter is reset, wherein the third condition comprises at least one of the following:

beam failure recovery succeeds, triggering transmission of subsequent BFRQ information is forbidden, triggering transmission of an SR for BFRQ is forbidden, the forbidding of the triggering transmission of subsequent BFRQ information is lifted, and the forbidding of the triggering transmission of an SR for BFRQ is lifted.

6. The method according to claim 5, wherein that the beam failure recovery succeeds comprises at least one of the following:

a physical downlink control channel (PDCCH) beam is switched;

a beam failure detection reference signal (BFD RS) beam is switched;

a physical downlink shared channel (PDSCH) beam is switched;

first downlink control information (DCI) is received from a network side;

first radio resource control (RRC) signaling is received from a network side; and a first media access control control element (MAC CE) command is received from a network side.

7. The method according to claim 6, wherein the first DCI has at least one of the following features:

the first DCI is transmitted on a dedicated control resource for beam failure recovery;

a format of the first DCI is a DCI format with cyclic redundancy check (CRC) scrambled by a radio network temporary identifier (RNTI) for BFR;

the first DCI is used for indicating beam information of a downlink channel or reference signal of the SCell in which the beam failure occurs;

the first DCI is used for indicating performing beam measurement in the SCell in which the beam failure occurs; and the first DCI is used for transmitting acknowledgment information for the BFRQ information;

wherein the first RRC signaling has at least one of the following features:

the first RRC signaling comprises release signaling for the SCell in which the beam failure occurs; and the first RRC signaling is used for configuring beam information of a downlink channel or reference signal of the SCell in which the beam failure occurs;

wherein the first MAC CE command has at least one of the following features:

the first MAC CE command is used for activating beam information of a downlink channel or reference signal of the SCell in which the beam failure occurs;

the first MAC CE command comprises deactivation signaling for the SCell in which the beam failure occurs; and the first MAC CE command is used for transmitting acknowledgment information for the BFRQ information.

8. The method according to claim 1, wherein when a fourth condition is met, the forbidding of the triggering transmission of subsequent BFRQ information is lifted, or the forbidding of the triggering transmission of an SR for BFRQ is lifted.

9. The method according to claim 8, wherein the fourth condition comprises at least one of the following:

the SCell is released, the SCell is deactivated, a BWP is switched, and beam failure recovery succeeds.

10. The method according to claim 1, wherein the SR is a dedicated SR, and the SR is transmitted on a network-configured dedicated physical uplink control channel (PUCCH) resource for BFR.

11. The method according to claim 1, wherein the BFRQ information comprises at least one of the following:

index information and new beam information of the SCell in which the beam failure occurs.

12. A terminal, comprising a memory, a processor, and a program stored in the memory and capable of running on the processor, wherein when the program is executed by the processor, the following steps are implemented:

triggering, by a terminal, transmission of at least one of beam failure recovery request (BFRQ) information and a scheduling request (SR) for BFRQ when a beam failure occurs in a secondary cell SCell, wherein the terminal has the following feature related to the SCell:

after the BFRQ information is transmitted, triggering transmission of subsequent BFRQ information is forbidden unconditionally or triggering transmission of an SR for BFRQ is forbidden unconditionally.

13. The terminal according to claim 12, wherein the terminal further has the following feature related to the SCell:

when a second condition is met, a beam failure instance (BFI) counter skips or stops counting.

14. The terminal according to claim 13, wherein the second condition comprises at least one of the following:

the SCell is released, the SCell is deactivated, a bandwidth part (BWP) is switched, and a beam failure occurs in the SCell.

15. The terminal according to claim 12, wherein when a fourth condition is met, the forbidding of the triggering transmission of subsequent BFRQ information is lifted, or the forbidding of the triggering transmission of an SR for BFRQ is lifted.

16. The terminal according to claim 15, wherein the fourth condition comprises at least one of the following:

the SCell is released, the SCell is deactivated, a BWP is switched, and beam failure recovery succeeds.

17. The terminal according to claim 12, wherein the terminal further has the following feature related to the SCell:

when a third condition is met, a BFI counter is reset, wherein the third condition comprises at least one of the following:

beam failure recovery succeeds, triggering transmission of subsequent BFRQ information is forbidden, triggering transmission of an SR for BFRQ is forbidden, the forbidding of the triggering transmission of subsequent BFRQ information is lifted, and the forbidding of the triggering transmission of an SR for BFRQ is lifted.

18. A non-transitory computer-readable storage medium, wherein the computer-readable storage medium stores a computer program, and when the computer program is executed by a processor, the following steps are implemented:

triggering, by a terminal, transmission of at least one of beam failure recovery request (BFRQ) information and a scheduling request (SR) for BFRQ when a beam failure occurs in a secondary cell (SCell), wherein the terminal has the following feature related to the SCell:

after the BFRQ information is transmitted, triggering transmission of subsequent BFRQ information is forbidden unconditionally or triggering transmission of an SR for BFRQ is forbidden unconditionally.

19. The non-transitory computer-readable storage medium according to claim 18, wherein the terminal further has the following feature related to the SCell:

when a second condition is met, a beam failure instance (BFI) counter skips or stops counting.

20. The non-transitory computer-readable storage medium according to claim 18, wherein the terminal further has the following feature related to the SCell:

when a third condition is met, a BFI counter is reset, wherein the third condition comprises at least one of the following:

beam failure recovery succeeds, triggering transmission of subsequent BFRQ information is forbidden, triggering transmission of an SR for BFRQ is forbidden, the forbidding of the triggering transmission of subsequent BFRQ information is lifted, and the forbidding of the triggering transmission of an SR for BFRQ is lifted.

* * * * *